United States Patent [19]

Kobayashi et al.

[11] Patent Number: 5,306,799
[45] Date of Patent: Apr. 26, 1994

[54] HIGH REFRACTIVE INDEX PLASTIC LENS AND COMPOSITION THEREFOR

[75] Inventors: Seiichi Kobayashi; Katsuyoshi Sasagawa; Yoshinobu Kanemura, all of Yokohama, Japan

[73] Assignee: Mitsui Toatsu Chemicals, Inc., Tokyo, Japan

[21] Appl. No.: 95,346

[22] Filed: Jul. 23, 1993

[30] Foreign Application Priority Data

Aug. 26, 1992 [JP] Japan .................... 4-226959

[51] Int. Cl.$^5$ .............................. C08G 18/32
[52] U.S. Cl. ..................................... 528/77
[58] Field of Search .......................... 528/77

[56] References Cited

U.S. PATENT DOCUMENTS 4,775,733 10/1988 Kanemura et al. .......... 528/67
5,191,055  3/1993 Kanemura et al. .......... 528/77

FOREIGN PATENT DOCUMENTS 408459  1/1991 European Pat. Off. .
2-275901 11/1990 Japan .

Primary Examiner—Maurice J. Welsh
Attorney, Agent, or Firm—Burns, Doane, Swecker & Mathis

[57] ABSTRACT

The present invention discloses a composition for high refractive index plastic lens consisting of a monomer mixture wherein a particular aliphatic thiol compound is added to a polyisocyanate represented by general formula (1):

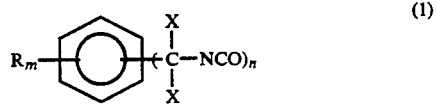

wherein each X represents a hydrogen atom or a methyl group; each R represents a chlorine atom, a bromine atom, a methyl group or an ethyl group; m represents an integer of 0–4; and n represents an integer of 2–4, and a polythiol of formula (2):

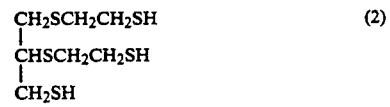

and a high refractive index plastic lens made of a urethane-containing resin obtained by polymerizing said composition.

10 Claims, No Drawings

HIGH REFRACTIVE INDEX PLASTIC LENS AND COMPOSITION THEREFOR

BACKGROUND OF THE INVENTION

1. Field of the Invention

The present invention relates to a composition for a high refractive index plastic lens having excellent heat resistance, low water absorption and excellent surface hardness and used in various optical lenses such as eyeglass lens and the like. The present invention also relates to a lens comprising a resin obtained by polymerizing said composition.

2. Prior Art

Plastic lenses are lightweight, fragmentation-resistant and dyeable as compared with inorganic lenses, so that they have gained rapid acceptances in recent years as optical elements such as eyeglass lenses and camera lenses. Resins widely employed these days for such purposes include a resin obtained by the cast polymerization of diethylene glycol bis(allyl carbonate) (hereinafter called "DAC"). This DAC resin has various advantages such as lightweightness, superb dyeability and good workability in cutting, grinding, etc., and can respond to fashion requirements. A lens made of the DAC resin, however, has a smaller refractive index than inorganic lenses. In order for the DAC lens to have optical properties similar to those of glass lenses, it is necessary for the DAC lens to have increased central thickness, peripheral thickness and curvature, unavoidably resulting in large overall thickness. Therefore there has been a desire for the development of a resin for a lens, having a higher refractive index.

Polyurethane lenses are known as a resin lens having a higher refractive index than the DAC lens. The present inventors proposed a polyurethane lens made of a polymer between a xylylene diisocyanate compound and a polythiol compound in U.S. Pat. No. 4,775,733. This lens is in wide acceptance as optical lenses such as eyeglass lens. The present inventors also proposed a polyurethane lens of even higher refractive index in U.S. Pat. No. 5,191,055. These polyurethane lenses, however generally have poor heat resistances as compared with lenses made of a resin obtained by radical polymerization of olefin group, e.g., a DAC resin and tend to cause lens deformation in the post-treatments of lens, for example, the dyeing and surface coating of lens wherein a heat treatment is conducted generally at 60°–90° C. In these polyurethane lenses, therefore, the heat treatment temperature must be kept low.

With respect to the method to improve the heat resistance of polyurethane resins, there are known Japanese Patent Laid-open No. 275901/1990 and EP 408459. The polyurethane resin described in Japanese Patent Laid-open No. 275901/1990, however, has a refractive index in the range of about 1.57–1.61, which is low and insufficient. The polyurethane resin obtained by the method of Japanese Patent Laid-open No. 275901/1990 shows high water absorption and, when made into a lens of small central thickness, leads to deformation caused by water absorption at the lens center in some cases. Further, the resin has a low surface hardness and, when molded into a lens, tends to have scars. Also, since the heat resistance of the polyurethane resin described in EP 408459 is higher, it is difficult to dye it by an ordinary method when made into a lens. It is further disclosed in EP 408459 that when there is used, as the thiol component, pentaerythritol which is the same as tetrakis(mercapto-methyl)methane used in the present invention, use of xylylene diisocyanate as the isocyanate component is not preferable.

Further in these prior techniques, the thiol component used for heat resistance improvement becomes a solid in some cases. For example, tetrakis(mercaptomethyl)methane (this is preferably used in the present invention) is a solid having a melting point of 72°–73° C. and, when used singly as the thiol component as in EP 408459, makes the handling very complicated in the molding of lens. Also, the compound represented by general formula (3):

described in Japanese Patent Laid-open No. 275901/1990 has a high viscosity ordinarily and therefore, when tetrakis(mercaptomethyl)methane as the component (c) is added in an increased proportion, crystals appear, making the handling complicated and reducing the workability. Moreover, the restriction in proportion of tetrakis-(mercaptomethyl)methane added makes impossible the sufficient improvement in heat resistance.

SUMMARY OF THE INVENTION

The objects of the present invention are to provide a method for improving the heat resistance of a polyurethane lens made of a polymer between a polyisocyanate compound and a polythiol compound so that wider heat conditions can be employed in the post-treatments of the lens such as dyeing and surface coating, as well as a polyurethane lens having low water absorption and an excellent surface hardness.

The present inventors made study to solve the above-mentioned problems and, as a result, have completed the present invention.

The present invention relates to a composition for high refractive index plastic lens, consisting of a monomer mixture comprising the following three components:

(a) at least one polyisocyanate represented by general formula (1):

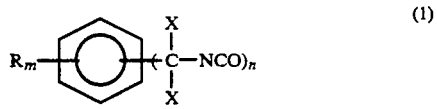

wherein each X represents a hydrogen atom or a methyl group; each R represents a chlorine atom, a bromine atom, a methyl group or an ethyl group; m represents an integer of 0–4; and n represents an integer of 2–4, (b) 1,2-bis[(2-mercaptoethyl)thio]-3-mercaptopropane represented by formula (2):

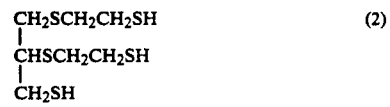

and (c) at least one aliphatic thiol compound having x hydroxyl groups (x is an integer of 0 or 1 or more) and y mercapto groups (y is an integer of 1 or more), wherein the total number (x+y) of the hydroxyl groups and the mercapto groups is 3 or more when the thiol compound has no ring structure in the molecule and is 2 or more when the thiol compound has a ring structure and wherein the number of the carbon atoms present between two hydroxyl groups, two mercapto groups or a hydroxyl and mercapto groups, which are most distant, is 6 or less, preferably 5 or less, as well as a high refractive index plastic lens made of a sulfur-containing urethane resin obtained by polymerizing said composition.

The plastic lens made of a sulfur-containing urethane resin obtained by polymerizing a monomer mixture comprising the three components of the present invention is a high refractive plastic lens wherein the low heat resistance of a plastic lens obtained by polymerizing a polyisocyanate of general formula (1) and a polythiol of formula (2) is improved without impairing the properties of said plastic lens.

DETAILED DESCRIPTION OF THE PREFERRED EMBODIMENTS

The present invention is hereinafter described in detail.

The compound represented by general formula (1), which is the component (a) of the present invention, specifically includes o-xylylene diisocyanate, m-xylylene diisocyanate, p-xylylene diisocyanate, tetramethyl-p-xylylene diisocyanate and tetramethyl-m-xylylene diisocyanate; and chlorination products, bromination products, methylation products and ethylation products thereof, for example, 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate and 4-ethyl-m-xylylene diisocyanate. Some of these compounds are commercially available.

1,2-Bis[(2-mercaptoethyl)thio]-3-mercaptopropane represented by formula (2), which is the component (b), can be easily produced by a process described in Japanese Patent Laid-open No. 270859/1990, i.e., a process which comprises reacting an epihalohydrin with 2-mercaptoethanol and then with thiourea.

Among the component (c), i.e., the aliphatic thiol compound having x hydroxyl groups (x is an integer of 0 or 1 or more) and y mercapto groups (y is an integer of 1 or more), wherein the number of the carbon atoms present between two hydroxyl groups, two mercapto groups or a hydroxyl and mercapto groups, which are most distant, is 6 or less, preferably 5 or less, examples of the compounds, in which the total number $(x+y)$ of the hydroxyl groups and the mercapto groups is 3 or more when the thiol compound has no ring structure in the molecule, include monothioglycerol, dithioglycerol, trithioglycerol, dimercaptopropanol, 1-mercaptomethyl-1,1-dihydroxymethylpropane, 1,4-dimercapto-2,3-hydroxybutane, tetrakis(mercaptomethyl)methane, 1,1,1-tris(mercaptomethyl)ethane and 1,1,1-tris(mercaptomethyl)propane. Examples of the aliphatic thiol compounds, in which the total number $(x+y)$ of the hydroxyl groups and the mercapto groups is 2 or more when the thiol compound has a ring structure in the molecule, include 2,5-dimercaptomethyl-1,4-dithiane, 2,5-dimercaptomethyl-2,5-dimethyl-1,4-dithiane, 2,5-dimercaptothiophen and 2,5-dimercaptomethylthiophen. Some of these compounds are easily available commercially. These compounds can be used singly or in combination.

In the present invention, of the above compounds, xylylene diisocyanate and tetrakis(mercaptomethyl)methane are preferably used as the components (a) and (c), respectively.

In the present invention, the ratio of the components (a), (b) and (c) used, i.e., the ratio of the at least one polyisocyanate represented by general formula (1) and the total of the polythiol represented by formula (2) and the at least one aliphatic thiol compound is 0.5-1.5 in terms of the ratio of NCO groups/(SH+OH) groups. The aliphatic thiol compound, which is the component (c), is used in an amount of 5-50% by weight based on the total polythiol component. When the amount of the aliphatic thiol compound is less than 5% by weight based on the total polythiol component, no sufficient improvement in heat resistance is obtainable. When the amount is more than 50% by weight, heat resistance of the obtained resin becomes too higher to dye the resin in an ordinary method. Therefore, the proportion of the thiol compound of the component (c) used is appropriately determined depending upon the kinds of the component (a) compound and the component (c) compound used and the properties required for the lens to be produced.

In the present invention, it is possible to add as necessary, at the time of polymerization, a polymerization catalyst for acceleration of polymerization and various additives such as ultraviolet absorber (for weatherability improvement), antioxidant, coloring inhibitor, fluorescent dye, light stabilizer and oil-soluble dye.

The production of the lens of the present invention is conducted by preparing a monomer mixture comprising at least one polyisocyanate represented by general formula (1), a polythiol represented by formula (2) and at least one aliphatic thiol compound, adding thereto additives as necessary, and subjecting the resulting mixture to known cast polymerization, that is, casting the mixture into a mold consisting of a glass- or metal-made mold and a resin-made gasket and heat-curing the mixture therein. At that time, the mold may be subjected to a known release treatment in advance to make easy the taking-out of the molded resin.

In the present invention, the component (C) compound may be mixed in advance with the component (b) compound to simplify the workability of lens production. When the component (c) compound is a solid, it is preferable to dissolve the compound in the component (b) compound in advance. In this case, the dissolution of the component (c) compound is easy because the component (b) compound is a low-viscosity liquid.

The polymerization temperature and time used in the cast polymerization differ depending upon the combination of the monomers used and the kinds and amounts of the additives used. However, in general, the temperature elevation is started from 5°-20° C. and continued to reach about 100°-130° C. in 8-30 hours.

The lens obtained in the present invention may be subjected as necessary to various physical and chemical treatments such as surface polishing, treatment for antistaticity, hard coat treatment, non-reflecting coat treatment, dyeing and treatment for photochromism in order to impart to the lens an anti-reflecting property, a higher hardness, improved wear resistance, improved chemical resistance, an antifogging property, fashionableness, etc. The lens obtained in the present invention is easily dyed with ordinary disperse dyes in water or a solvent. In the present invention, a carrier as dyeing assistant may be added in the dye bath for easy dyeing.

The sulfur-containing urethane resin obtained in the present invention has various advantages, i.e., very low dispersion, high refractive index, excellent heat resistance, colorlessness, transparency, light-weightness, excellent weather resistance, excellent impact resistance, low water absorption and excellent surface hardness, and is suitably used not only as a material for optical elements such as eyeglass lenses and camera lenses but also as a glazing material and a material for coatings and adhesives.

The present invention is hereinafter described more specifically by way of Examples. However, the present invention is in no way restricted by these Examples. In the Examples, parts are by weight.

The lenses prepared in the Examples and Comparative Examples were measured for performances by the following test methods:

Refractive index and Abbe's number

Measured at 20° C. by a Pulfrich refractometer.

Appearance

Examined visually.

Heat resistance

A test piece was placed under a load of 5 g by using a thermomechanical analyzer manufactured by Perkin-Elmer Inc., U.S.A. It was heated at a rate of 2.5° C./min so that its thermal deformation starting temperature was measured Dyeability Each of ML-Yellow, ML-Red and ML-Blue (each is a disperse dye for a plastic lens, manufactured by Mitsui Toatsu Dye, Ltd.) was made into a 5 g/l aqueous solution, and each solution was placed in a dye bath. A test piece (a 9 mm-thick flat plate) was immersed in each dye bath at 95° C. for 5 minutes for dyeing. Each of the dyed test pieces was measured for transmittance of 400–700 nm using a spectrophotometer U-2000 (manufactured by Hitachi, Ltd.). When the overall dyeability evaluation of the test piece was good, the dyeability was rated as "◯" and, when the overall dyeability evaluation of the test piece was poor or the test piece had no dyeability, the dyeability was rated as "✕."

Heat resistance during dyeing

A test piece was immersed in each of the above dye baths at 95° C. for 5 minutes. Then, the deformation of the test piece was examined visually.

Water absorption

A test piece was prepared in accordance with JIS K 7209 and immersed in water for 48 hours at room temperature. The water absorption of the test piece was calculated from the weight change of the test piece before and after the immersion.

Surface hardness

The pencil hardness of a test piece was measured using a pencil scratch tester for coating film, of JIS K 5401.

EXAMPLE 1

There were uniformly mixed 69.6 parts (0.37 mole) of m-xylylene diisocyanate, 44.8 parts (0.17 mole) of 1,2-bis[(2-mercaptoethyl)thio]-3-mercaptopropane, 11.2 parts (0.06 mole) of tetrakis(mercaptomethyl)methane and 0.1% by weight, based on the total amount of the mixture, of dibutyltin dilaurate. The mixture was thoroughly degasified and then cast into a mold consisting of a glass mold subjected to a release treatment and a gasket. The mixture in the mold was heat-cured in 20 hours while slowly elevating the temperature from 40° C. to 120° C. After the completion of the polymerization, the resulting polymer was slowly cooled and taken out of the mold. Thus obtained resin was colorless and transparent and had excellent impact resistance, a refractive index $n_d$ of 1.66, an Abbe's number $v_d$ of 32 and a thermal deformation starting temperature of 114° C. When dyed in dye baths of 95° C., the lens showed no deformation. The transmittances after dyeing were 30% when dyed with ML-Yellow, 37% when dyed with ML-Red and 47% when dyed with ML-Blue, and the dyeability was "◯" in the overall evaluation. The water absorption after 48 hours was 0.04%. The surface hardness was 2 H.

EXAMPLE 2

There were uniformly mixed 96.0 parts (0.51 mole) of m-xylylene diisocyanate, 36.4 parts (0.14 mole) of 1,2-bis[(2-mercaptoethyl)thio]-3-mercaptopropane, 36.4 parts (0.20 mole) of 1,1,1-tris(mercaptomethyl)propane and 0.1% by weight, based on the total amount of the mixture, of dibutyltin dilaurate. The mixture was thoroughly degasified and then cast into a mold consisting of a glass mold subjected to a release treatment and a gasket. The mixture in the mold was heat-cured in 20 hours while slowly elevating the temperature from 40° C. to 120° C. After the completion of the polymerization, the resulting polymer was slowly cooled and taken out of the mold. Thus obtained resin was colorless and transparent and had excellent impact resistance, a refractive index $n_d$ of 1.65, an Abbe's number $v_d$ of 33 and a thermal deformation starting temperature of 120° C. When dyed in dye baths of 95° C., the lens showed no deformation. The transmittances after dyeing were 37% when dyed with ML-Yellow, 44% when dyed with ML-Red and 54% when dyed with ML-Blue, and the dyeability was "◯" in the overall evaluation. The water absorption after 48 hours was 0.04%. The surface hardness was 2 H.

COMPARATIVE EXAMPLE 1

There were uniformly mixed 65.4 parts (0.35 mole) of m-xylylene diisocyanate, 60.1 parts (0.23 mole) of 1,2-bis[(2-mercaptoethyl)thio]-3-mercaptopropane and 0.1% by weight, based on the total amount of the mixture, of dibutyltin dilaurate. The mixture was thoroughly degasified and then cast into a mold consisting of a glass mold subjected to a release treatment and a gasket. The mixture in the mold was heat-cured in 20 hours while slowly elevating the temperature from 40° C. to 120° C. After the completion of the polymerization, the resulting polymer was slowly cooled and taken out of the mold. Thus obtained resin was colorless and transparent and had excellent impact resistance, a refractive index $n_d$ of 1.66, an Abbe's number $v_d$ of 33 and a thermal deformation starting temperature of 98° C. Therefore, the resin had inferior heat resistance than the resin obtained in Example 1. When dyed in dye baths of 95° C., the lens showed deformation. The transmittances after dyeing were 24% when dyed with ML-Yellow, 31% when dyed with ML-Red and 40% when dyed with ML-Blue, and the dyeability was "◯" in the overall evaluation.

COMPARATIVE EXAMPLE 2

Similarly to Example 2 of EP 408459 there were uniformly mixed 65.4 parts (0.35 mole) of m-xylylene diisocyanate, 29.2 parts (0.17 mole) of dithioerythritol and 0.1% by weight, based on the total amount of the mixture, of dibutyltin dilaurate. The mixture was thoroughly degasified and then cast into a mold consisting of a glass mold subjected to a release treatment and a gasket. The mixture in the mold was heat-cured in 20 hours while slowly elevating the temperature from 40° C. to 120° C. After the completion of the polymerization, the resulting polymer was slowly cooled and taken out of the mold. Thus obtained resin was colorless and transparent and had excellent impact resistance, a refractive index $n_d$ of 1.61, an Abbe's number $v_d$ of 33 and a thermal deformation starting temperature of 165° C. When dyed in dye baths of 95° C., the lens showed no deformation. The transmittances after dyeing were 85% when dyed with ML-Yellow, 86% when dyed with ML-Red and 86% when dyed with ML-Blue, and the dyeability was "×" in the overall evaluation.

COMPARATIVE EXAMPLE 3

Forty-five parts (0.09 mole) of pentaerythritol tetrakis(3-mercaptopropionate) and 5.0 parts (0.02 mole) of tetrakis(mercaptomethyl)methane were mixed with heating to obtain a uniform solution. The solution was cooled to room temperature, which gave a precipitate of tetrakis(mercaptomethyl)methane.

COMPARATIVE EXAMPLE 4

There were uniformly mixed 41.2 parts (0.22 mole) of m-xylylene diisocyanate, 47.5 parts (0.10 mole) of pentaerythritol tetrakis(3-mercaptopropionate), 2.5 parts (0.01 mole) of tetrakis(mercaptomethyl)methane and 0.1% by weight, based on the total amount of the mixture, of dibutyltin dilaurate. The mixture was thoroughly degasified and then cast into a mold consisting of a glass mold subjected to a release treatment and a gasket. The mixture in the mold was heat-cured in 20 hours while slowly elevating the temperature from 40° C. to 120° C. After the completion of the polymerization, the resulting polymer was slowly cooled and taken out of the mold. Thus obtained resin was colorless and transparent and had excellent impact resistance, a refractive index $n_d$ of 1.60, an Abbe's number $v_d$ of 36 and a thermal deformation starting temperature of 97° C. Therefore, the resin had a lower refractive index and poorer heat resistance than the resin obtained in Example 1. When dyed in dye baths of 95° C., the lens showed deformation. The transmittances after dyeing were 24% when dyed with ML-Yellow, 31% when dyed with ML-Red and 40% when dyed with ML-Blue, and the dyeability was "◯" in the overall evaluation. The water absorption after 48 hours was 0.12% and higher than that of Example 1. The surface hardness was HB and inferior to that of Example 1.

What is claimed is:

1. A composition for high refractive index plastic lens, consisting of a monomer mixture comprising the following three components:

(a) at least one polyisocyanate represented by general formula (1):

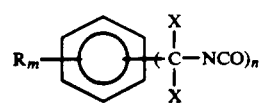

wherein each X represents a hydrogen atom or a methyl group; each R represents a chlorine atom, a bromine atom, a methyl group or an ethyl group; m represents an integer of 0–4; and n represents an integer of 2–4, (b) 1,2-bis[(2-mercaptoethyl)thio]-3-mercaptopropane represented by formula (2):

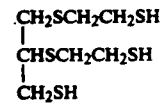

and (c) at least one aliphatic thiol compound having x hydroxyl groups (x is an integer of 0 or 1 or more) and y mercapto groups (y is an integer of 1 or more), wherein the total number (x+y) of the hydroxyl groups and the mercapto groups is 3 or more when the thiol compound has no ring structure in the molecule and is 2 or more when the thiol compound has a ring structure and wherein the number of the carbon atoms present between two hydroxyl groups, two mercapto groups or a hydroxyl and mercapto groups, which are most distant, is 5 or less.

2. A composition for high refractive index plastic lens according to claim 1, wherein the ratio of the at least one polyisocyanate represented by general formula (1) and the total of the polythiol represented by formula (2) and the at least one aliphatic thiol compound is 0.5 to 1.5 in terms of the ratio of NCO groups/(SH+OH) groups and the aliphatic thiol compound, which is the component (c), is used in an amount of 5 to 50% by weight based on the total polythiol component.

3. A composition for high refractive index plastic lens, consisting of a monomer mixture comprising the following three components:

(a) at least one polyisocyanate represented by general formula (1):

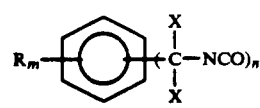

wherein each X represents a hydrogen atom or a methyl group; each R represents a chlorine atom, a bromine atom, a methyl group or an ethyl group; m represents an integer of 0–4; and n represents an integer of 2–4, (b) 1,2-bis[(2-mercaptoethyl)thio]-3-mercaptopropane represented by formula (2):

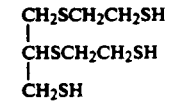

and (c) at least one aliphatic thiol compound having x hydroxyl groups (x is an integer of 0 or 1 or more) and y mercapto groups (y is an integer of 1 or more), wherein the total number (x+y) of the hydroxyl groups and the mercapto groups is 3 or more and wherein the number of the carbon atoms present between two hydroxyl groups, two mercapto groups or a hydroxyl and mercapto groups, which are most distant, is 6 or less.

4. A composition for high refractive index plastic lens according to claim 3, wherein the ratio of the at least one polyisocyanate represented by general formula (1) and the total of the polythiol represented by formula (2) and the at least one aliphatic thiol compound is 0.5 to 1.5 in terms of the ratio of NCO groups/(SH+OH) groups and the aliphatic thiol compound, which is the component (c), is used in an amount of 5 to 50% by weight based on the total polythiol component.

5. A high refractive index plastic lens made of a sulfur-containing urethane resin obtained by polymerizing the composition according to claim 1.

6. A high refractive index plastic lens made of a sulfur-containing urethane resin obtained by polymerizing the composition according to claim 2.

7. A high refractive index plastic lens made of a sulfur-containing urethane resin obtained by polymerizing the composition according to claim 3.

8. A high refractive index plastic lens made of a sulfur-containing urethane resin obtained by polymerizing the composition according to claim 4.

9. A composition for high refractive index plastic lens according to claim 1, wherein the component (a) is xylylene diisocyanate and the component (c) is tetrakis(mercaptomethyl)methane.

10. A high refractive index plastic lens made of a sulfur-containing urethane resin obtained by polymerizing the composition according to claim 9.

* * * * *